INVENTORS.
Peter Paatzsch
Toma Tomoff

BY Daniel R. Levinson

ATTORNEY.

United States Patent Office
3,554,654
Patented Jan. 12, 1971

3,554,654
SINGLE-BEAM PHOTOMETER
Peter Paatzsch and Toma Tomoff, Uberlingen (Bodensee), Germany, assignors to Bodenseewerk Perkin-Elmer & Co. G.m.b.H., Ubderlingen (Bodensee), Germany
Filed Oct. 3, 1968, Ser. No. 764,791
Claims priority, application Germany, Oct. 18, 1967, 1,648,841
Int. Cl. G01j 3/46; G01n 21/26
U.S. Cl. 356—180     4 Claims

ABSTRACT OF THE DISCLOSURE

A single beam photometric system for determining the concentration of a tested-for sample component in a series of individual sample cells includes a carrier for moving the individual cells into the measuring light beam, the transmitted intensity of which varies with the concentration of the tested-for component. An "empty value" reference level is set into the instrument by positioning a calibration cell, identical to the sample cells but without the specific component being tested for, in the light beam, and adjusting, for example, a variable potentiometer in the detector signal output to a 100% transmission level. An automatic gain control type of feed-back is provided by monitoring a fixed proportion of the detector output when the measuring beam passes between each of the sample cells in a series (the sample cells being sufficiently spaced apart for this purpose). In this manner, the correct "empty value" reference signal is readjusted between such sample measurement without requiring reintroduction of an actual calibration cell or any manual steps. This automatic gain control monitoring may be provided by a feedback loop having a switch which is closed only during those positions of the sample cell carrier in which the intermediate space between cells is in the light beam.

---

The present invention relates to a single-beam photometer for the photometric measurement of samples for the purpose of determining the concentration thereof. In particular, the apparatus is of the type wherein the samples are contained in a series of cells arranged in a cell carrier and are successively conveyed by the latter into the path of a light beam which is directed onto a radiation detector, and wherein the detector output signal, being adjusted to 100% transmission for a cell free of the tested-for component, is applied to an amplifier. The gain of the amplifier is controlled automatically by means of a feedback circuit, and the output of this amplifier is applied to at least one read-out device, preferably both an indicator and a signal processing device.

The total absorbance or extinction of a sample is known to be composed of the sum of the absorbances or extinctions of the tested-for sample component and the so-called "empty value." The empty value is the absorbance or extinction of a similar sample which does not contain the tested-for component; this "empty value" absorbance may be that for instance, of a solvent, of any admixed reagent, and the attenuation of the light beam caused, for example, by the cell walls, a thermostaticized bath or the like. The extinction or absorbance (and therewith the concentration) of the tested-for component results from the difference between the total sample extinction and of the empty value extinction.

Single-beam photometers are known, having a cell device which permits the manual or automatic introduction of a calibration cell having the "empty value" into the path of rays. By varying the size of a slit in the path of rays or by a variation of the gain in the circuit of the radiation detector, the indication may then be adjusted to the extinction or absorbance value of 0 (or transmission of 100%). Thereafter, the cell containing the sample to be analyzed is introduced into the path of rays. The value indicated then corresponds to the absorbance (or transmission) of the tested-for component.

Furthermore, double-beam photometers are known, wherein the "empty value" is introduced into a reference beam and the sample into a measuring beam. The absorbance or extinction of the tested-for component is determined by a comparison of the intensities of the measuring and reference beams. Such a double-beam arrangement requires a considerable quantity of optical apparatus, since two beams of equal intensities must be produced from the same originating source of light.

It is an object of the present invention to provide a single-beam photometer for determining the concentration of a series of samples, wherein the "empty value" to which the measurement is referenced is the same for all samples.

It is a particular object of the invention to provide a photometer of the type indicated which is as simple as possible in that repeated introduction of a reference cell into the path of rays is avoided.

It is a further object of the invention to design a single-beam photometer of the type indicated in such manner that non-linearities of the calibration curve in the vicinity of the origin of coordinates (i.e., near zero concentration of the tested-for component and absorbance), the result of which is that the extension of the linear range of the calibration curve does not pass through the origin of coordinates, may be taken into consideration.

The single-beam photometer according to the invention is characterized in that a series of sample cells are spaced apart a substantial distance in a carrier in such manner that upon forward conveyance by the carrier, the light beam will pass between the cells and strike the detector during intermediate or change-over positions of the cells, that the detector signal is supplied to the indicator or signal processing device via an additional continuously adjustable signal attenuator and that the feedback circuit (automatically controlling the gain of the amplifier) is closed only in such intermediate positions of the cells and of the cell carrier, in which the light beam passes between the cells.

With a single-beam photometer of the type as indicated hereinbefore, the empty value may be adjusted only once for all samples to be analyzed in the following manner.

A calibrator cell, having the "empty value" (i.e., being substantially the same as the sample cells in every respect except for exclusion of the tested-for component), is introduced into the measuring beam. The feedback circuit for the control of the gain is opened. Now an additional signal attenuator is adjusted such that the indicator registers a 100% transmission, corresponding to an absorbance or extinction of zero. In this manner, the "empty value" is "stored" electrically in this additional attenuator. When an actual sample cell is subsequently introduced into the measuring beam (in the same position as formerly occupied by the "empty value" calibration cell), further absorbance (or extinction) will occur in a manner (linearly) related to the concentration of the tested-for sample component. The transmitted beam intensity will therefore decrease with respect to the empty value, and an accordingly smaller indication will be made by the instrument. Then, this indication corresponds to the transmission of the sample containing the tested-for component in relation to the "empty value" adjusted on the signal attenuator. Upon forward conveyance of the samples by the carrier, the beam strikes the radiation detector by passing between the cells each time an intermediate position occurs. Via a feedback circuit the output signal of the amplifier is controlled to a predetermined constant value at (and only at) such intermediate positions. This control is effective to compensate variations, for example, in the lamp brightness, variations in the detector sensitivity and in the amplifier as well as milkiness of the bath liquid (used to maintain constant temperature of the samples). Thus, the storage of the empty value is so-to-speak effected in that the beam intensity upon passage through a cell containing the empty value is compared with the beam intensity when the beam passes between the cells. The signal obtained in the latter case (i.e., intermediate position of the cell movement) is normalized to a constant value by the gain control. By the additional signal attenuator a signal is picked off having a predetermined relation (determined by the set-in "empty value") to this normalized signal. Thus, with the photometer according to the invention the actual "empty value" need be measured and considered only once (before the whole series of samples are measured). Nonetheless, a reference measurement (and gain adjustment) is effected after each individual measurement of each sample in the series.

The arrangement according to the invention also permits the consideration of non-linearities which occur in the vicinity of the origin of coordinates of the calibraton curve. Such non-linearities in the vicinity of the origin of coordinates result from the fact that the concentration in the linear range of the calibration curve is not directly proportional to the extinction (i.e., the measured absorbance). The relation rather is:

$$C=KE+a$$

wherein C the concentration, E the extinction or absorbance, K a proportionality factor and $a$ an addition constant. When using a digital printer, preceded by corresponding logarithmic conversion and analog-to-digital conversion circuits, it is not possible to subtract the addition constant $a$ from the result. However, this is possible with the adjustable signal attenuator, as is shown immediately hereinafter.

When transforming the preceding equation by considering $$E=\log \frac{1}{T}$$

where T is the transmittance in decimal form (i.e., $T=0.50$ for 50% transmission), the result is:

$$C=K \log \frac{1}{T}+a$$

By replacing the addition constant $a$ by a constant $b$ related to $a$ in the following manner:

$$a=K \log b$$

the concentration C may be written in the form:

$$C=K \log \frac{1}{T}+K \log b = K \log \frac{b}{T}$$

Therefrom, it results that the constant $a$ may be taken into consideration in that the voltage proportional to the transmission, T, is divided by $b$. This factor may be caused by adjustment of the signal attenuator.

Since, depending on the form of the calibration curve in the vicinity of the origin of coordinates, the addition constant $a$ may be either positive or negative, $b$ may accordingly also be less than 1. In order to render possible an adjustment in both directions, the arrangement preferably provides that the feedback circuit includes a fixed voltage divider at which a partial voltage of the output of the controllable amplifier is picked off. This amplifier is controllable by the partial voltage via a switch synchronized with the movement of the cells and of the cell carrier as they pass through the light beam so as to close when the light beam passes between two cells, and the additional signal attenuator (for the "empty value" calibration) is an adjustable voltage divider connected to the output of the controllable amplifier in parallel to the fixed voltage divider. In this manner, the fixed voltage divider is effective to supply a reference point which is less than the total output voltage of the amplifier. At the adjustable voltage divider voltages may thus be picked off which are greater (or less) than this fixed reference value.

One exemplary embodiment of the present invention will be described with reference to the accompanying drawings, in which:

FIG. 1 schematically shows in plan an arrangement according to the invention during the measurement of the sample;

Figure 1:
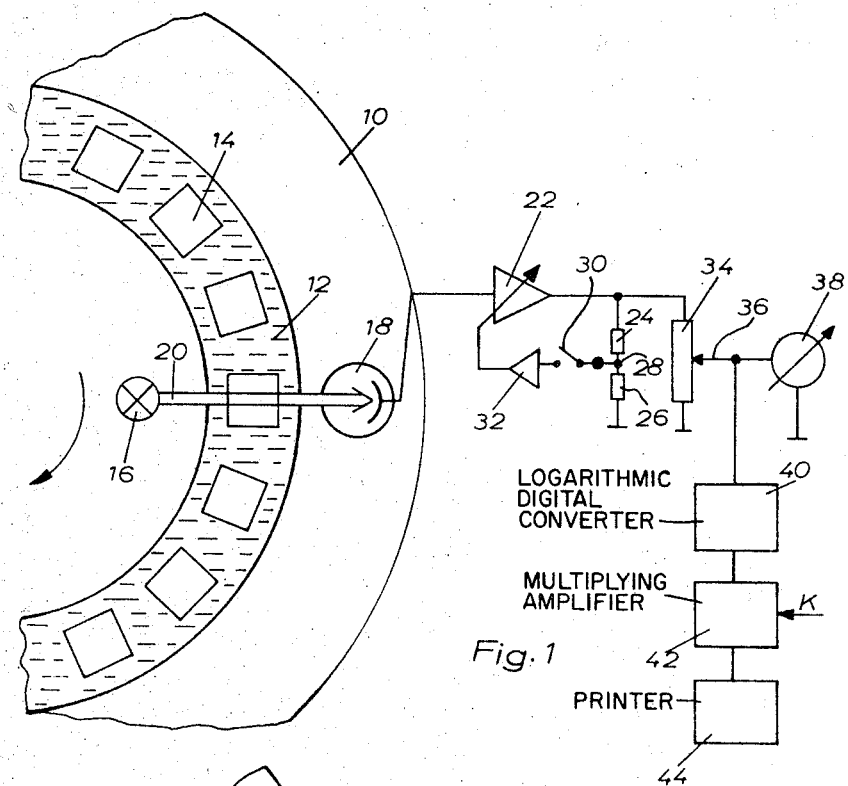
Figure 2:
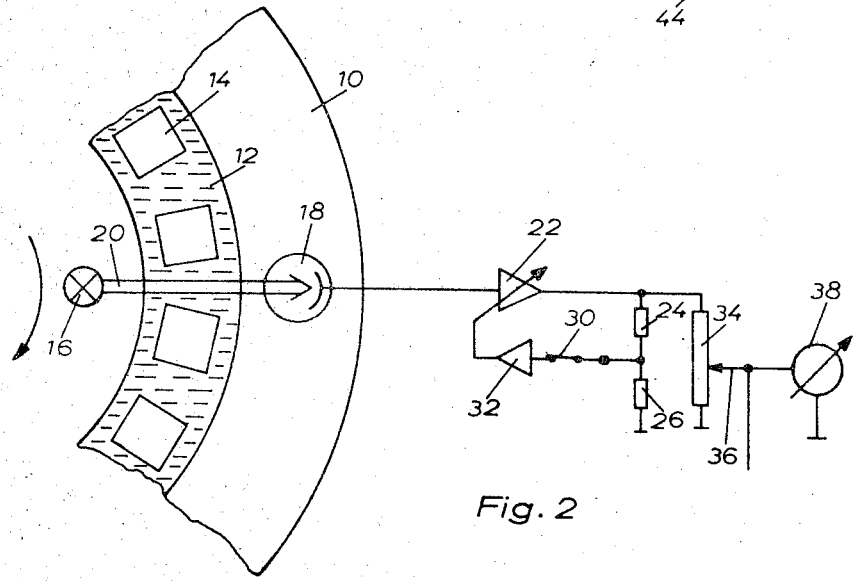
FIG. 2 shows the same arrangement according to the invention during the reference measurement between samples.
Figure 3:
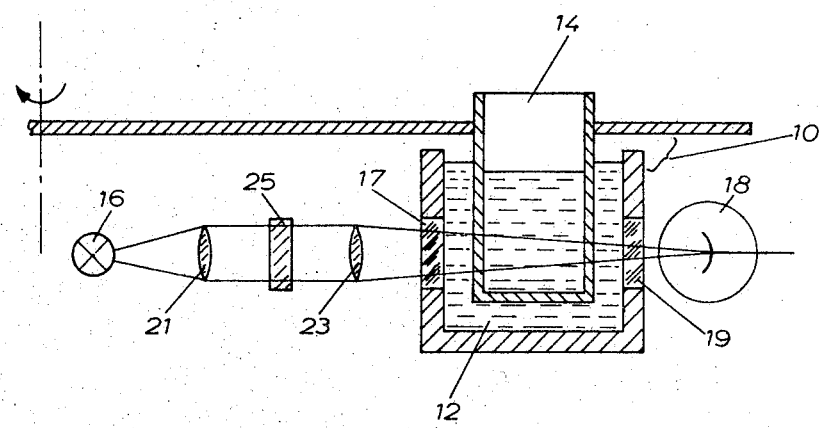
FIG. 3 is a vertical section through the center of FIG. 1.

The single exemplary embodiment illustrates the application of the invention wherein the cell carrier is a turntable 10, in which there are arranged regularly spaced apart cells 14. The cells run in an annular thermostaticized liquid bath 12. As may best be seen from FIG. 3, light originating from source 16, which is positioned inside of the annular bath 12, is formed into a beam by lenses 21 and 23. This beam 20 passes through filter 25 before passing through windows 17 and 19 of the bath, so as ultimately to reach detector 18 outside the bath perimeter. Upon rotation of the entire turntable 10, the different cells 14 are successively moved through the path of the light beam 20 (see FIG. 1). In intermediate positions the light beam 20 passes between the cells 14, so as to pass only through the bath, as illustrated in FIG. 2.

The output of the radiation detector 18 is supplied to the (main) input of a controllable amplifier 22. The output of the amplifier 22 is connected to a fixed voltage divider constituted by the fixed resistors 24 and 26. Between the resistors 24 and 26, a reference voltage is picked off at the point 28, which controls the gain of the controllable amplifier 22 via a switch 30 and a pilot amplifier 32. In parallel to the fixed voltage divider 24, 26, at the output of amplifier 22, an adjustable voltage divider 34 is connected having a variable pick-off or slider 36. The slider 36 of the voltage divider 34 is connected to an indicating instrument such as a meter 38. The picked-off voltage is simultaneously supplied to a circuit arrangement 40, which forms the logarithm of the signal and simultaneously converts the same into digital form. In this manner, a value is obtained for the absorbance or extinction from a signal proportional to the transmission of the sample. In a circuit 42, by considering the relationship between extinction and concentration, the concentration of the wanted component is determined by considering a proportionality factor K, and the resulting data is printed in a printer 44.

The exemplary apparatus just described operates as follows.

First a (calibrating) sample cell is introduced into the path of rays of the beam 20, which cell represents "the empty value," as being, for instance, filled with pure solvent and an admixed reagent (but no tested-for sample component). The switch 30 is open and there is an indication on the meter 38. By adjusting the slider 36, this indication on the instrument 38 is caused to assume a value corresponding to a transmission of 100% (i.e., an absorbance of zero). When a cell 14 which is filled with a sample containing the wanted component is substituted for the calibration cell, there will be another indication of the transmission on the instrument 38 corresponding to the extinction (absorbance) caused by the tested-for component. Thus, the empty value is stored by the adjustment of the potentiometer slider 36, in that the sample measurement indicated will be proportional to this "empty value" setting. In order to effect a monitoring (i.e., effectively a recalibration) each time between the sample measurements to compensate variations, for example, in the brightnes of the lamp 16, the sensitivity of the detector 18 or the gain of the amplifier 22, the switch 30 is closed during the intermediate position, of the cells, as illustrated in FIG. 2. In this intermediate position the beam 20 passes between two adjacent cells and effectively passes only through the bath. The signal thus obtained is controlled to a constant value through the pilot amplifier 32, by varying the gain of the controllable amplifier 22. This feedback or automatic gain control technique is known per se in prior single-beam photometers. The switch 30 may be opened and closed in synchronism with the "test" and intermediate positions of the sample cells (i.e., the FIG. 1 and FIG. 2 positions, respectively) by any suitable means, including for example, direct cam actuation by contouring any convenient part of the rotating table 10.

Obviously, the invention may be adapted for use with other types of sample carriers besides the circular turntable shown. Similarly other changes in various details may be made without departing from the invention, as defined by the scope of the appended claims.

What is claimed is:

1. In a single-beam photometric system for determining the concentration of at least one specific sample component contained in a series of cells arranged in a movable cell carrier for successively conveying said cells into the path of a measuring light beam directed onto a radiation detector, the electrical signal output of which is fed to the input of a controllable amplifier adapted to be controlled automatically by a feedback circuit, the amplifier output being supplied to a signal readout device, the improvement comprising:

said sample cells being spaced apart a distance greater than the diameter of said measuring light beam, so that during intermediate positions of the movement of said cell carrier said light beam passes between said cells so as to reach said radiation detector without passing through any sample:

a continuously adjustable signal attenuator, connected to the output of said controllable amplifier and adjustable to cause a 100% transmission signal at said readout device for an "empty value" sample which is free of said specific sample component;

said controllable amplifier having a grain-varying feedback circuit connected to its output, said feed-back circuit being further optionally operatively connected to the control input of said controllable amplifier by switch means, closed only during said intermediate positions in which said light beam passes between a pair of said sample cells;

whereby the effective gain of said controllable amplifier is repetitively, automatically adjusted between each actual sample measurement to compensate for variations in: the brightness of the original source of said measuring light beam, the sensitivity of said detector, the gain of said amplifier, and other factors adversely affecting the stability of the measured signal for a given concentration of said specific sample component being determined.

2. A photometric system according to claim 1, in which:

said feedback circuit comprises a fixed voltage divider connected across said controllable amplifier output, and a fixed pick-off tap whereat a fixed proportion of the total voltage of said amplifier output is constantly available;

said switch means being positioned in an electrical lead from said fixed pick-off tap, so that the gain of said controllable amplifier is automatically adjusted at least in part by said fixed proportion of its output voltage, only when said beam passes between sample cells during said intermediate positions of said cell carrier.

3. A photometric system according to claim 2, in which:

said continuously adjustable signal attenuator comprises an adjustable additional voltage divider connected to said controllable amplifier output in parallel with said fixed voltage divider, and having an adjustable tap at which an adjustable particular proportion of the total voltage of said amplifier output is present;

said readout device being operatively connected to said adjustable tap of said adjustable voltage divider.

4. A photometric system according to claim 1, in which:

said cell carrier comprises a generally circular turntable;

said turntable comprises a generally annular temperature-regulated bath, enclosed in part by a pair of substantially transparent, substantially concentric arcuate walls;

said sample cells are arranged in said annular bath so as to have a constant, substantial circumferential space between cells;

whereby the measuring light beam, traveling substantially radially of said turntable from a light source situated inwardly of said annular bath, will pass through said transparent walls to the radiation detector situated radially outside of said bath, so as to pass through a sample cell or between sample cells as the turntable is rotated into different positions.

References Cited

UNITED STATES PATENTS 3,437,822    4/1969    Fitzsimmons    356—205
3,480,369    11/1969    Smythe    356—246

RONALD L. WIBERT, Primary Examiner

C. CLARK, Assistant Examiner

U.S. Cl. X.R.

250—218